(12) United States Patent
Katepalli et al.

(10) Patent No.: US 9,014,688 B2
(45) Date of Patent: Apr. 21, 2015

(54) GENERATING MEASUREMENT REPORTS UNDER RAPID DEGRADATION OF RADIO CONDITIONS

(75) Inventors: Venkateswarlu Katepalli, Birmingham (GB); Raghavendra Magadi Rangaiah, West Bromwich (GB); Takashi Suzuki, Ichikawa (JP); Andrew John Farnsworth, Bromsgrove (GB)

(73) Assignee: BlackBerry Limited, Waterloo, Ontario (CA)

( * ) Notice: Subject to any disclaimer, the term of this patent is extended or adjusted under 35 U.S.C. 154(b) by 50 days.

(21) Appl. No.: 13/389,238

(22) PCT Filed: Aug. 10, 2010

(86) PCT No.: PCT/GB2010/001511
§ 371 (c)(1),
(2), (4) Date: Apr. 23, 2012

(87) PCT Pub. No.: WO2011/018616
PCT Pub. Date: Feb. 17, 2011

(65) Prior Publication Data
US 2012/0202482 A1    Aug. 9, 2012

Related U.S. Application Data

(60) Provisional application No. 61/232,681, filed on Aug. 10, 2009.

(51) Int. Cl.
*H04W 24/00* (2009.01)
*H04W 36/00* (2009.01)
*H04W 36/30* (2009.01)

(52) U.S. Cl.
CPC .......... *H04W 36/0083* (2013.01); *H04W 36/30* (2013.01)

(58) Field of Classification Search
USPC ............ 455/423, 436–438, 67.11, 67.16, 442
See application file for complete search history.

(56) References Cited

U.S. PATENT DOCUMENTS 7,953,413 B2 *   5/2011   Hall et al. ..................... 455/436
2004/0072565 A1 *   4/2004   Nobukiyo et al. ............ 455/436
(Continued)

FOREIGN PATENT DOCUMENTS

| WO | 2008112126 A1 | 9/2008 |
| WO | 2009058069 A1 | 5/2009 |
| WO | 2010104446 A1 | 9/2010 |

OTHER PUBLICATIONS

PCT International Search Report; Application No. PCT/GB2010/001511; Mar. 29, 2011; 7 pages.
(Continued)

*Primary Examiner* — Kashif Siddiqui
*Assistant Examiner* — Mong-Thuy Tran
(74) *Attorney, Agent, or Firm* — Conley Rose, P.C.; J. Robert Brown, Jr.

(57) ABSTRACT

A user equipment (UE), comprising at least one component configured to support a handover during decreasing radio conditions, wherein an event is triggered using at least one of a time to trigger for rapid degradation or radio conditions (TTTrd) value and a filter coefficient for rapid degradation of radio conditions (FCrd) value that are different than the corresponding standard values indicated by a network. Also included is a UE, comprising at least one component configured to support a method comprising obtaining cell measurements using network indicated standard parameters and parameters configured for rapid degradation of radio conditions, monitoring radio conditions, and evaluating an event using the parameters configured for rapid degradation of radio conditions if rapid degradation of radio conditions is detected, or using the network indicated standard parameters otherwise.

33 Claims, 6 Drawing Sheets (56) References Cited

U.S. PATENT DOCUMENTS

| | | | |
|---|---|---|---|
| 2006/0160539 A1 | 7/2006 | Juan et al. | |
| 2006/0258386 A1* | 11/2006 | Jeong et al. | 455/525 |
| 2008/0220784 A1* | 9/2008 | Somasundaram et al. | 455/437 |
| 2008/0225801 A1* | 9/2008 | Turk | 370/332 |
| 2009/0059871 A1 | 3/2009 | Nader et al. | |
| 2010/0112958 A1* | 5/2010 | Krishnamurthy et al. | 455/67.11 |
| 2010/0120429 A1* | 5/2010 | Kazmi et al. | 455/436 |
| 2010/0273487 A1* | 10/2010 | Alonso-Rubio et al. | 455/436 |
| 2010/0298001 A1* | 11/2010 | Dimou et al. | 455/441 |
| 2011/0014906 A1* | 1/2011 | Ho et al. | 455/422.1 |
| 2011/0028144 A1* | 2/2011 | Catovic et al. | 455/423 |

OTHER PUBLICATIONS

PCT Written Opinion of the International Searching Authority; Application No. PCT/GB2010/001511; Mar. 29, 2011; 13 pages.
3GPP TS 25.331 V8.7.0; 3rd Generation Partnership Project; Technical Specification Group Radio Access Network; Radio Resource Control (RRC); Protocol Specification; Release 8; Jun. 2009; 1, 127 pages.
RAN WG2 Meeting #64; "The Need for Filter Coefficient"; R2-086416; Prague, Czech Republic; Nov. 10-14, 2008; 3 pages.
Canadian Office Action; Application No. 2,770,349; Nov. 19, 2013; 3 pages.
3GPP TS 36.331 V8.6.0; 3rd Generation Partnership Project; Technical Specification Group Radio Access Network; Evolved Universal Terrestrial Radio Access (E-UTRA) Radio Resource Control (RRC); Protocl Specification; Release 8; 207 pages.
Chinese Office Action as Received in Co-pending Application No. 201080045584.4 on Feb. 8, 2014; 9 pages. (No English translation available).
Chinese Office Action as Received in Co-pending Application No. 201080045584.4 on Oct. 21, 2014; 6 pages (No English translation available).
Chinese Office Action; Application No. 201080045584.4; Jul. 23, 2014; 15 pages.

* cited by examiner

GENERATING MEASUREMENT REPORTS UNDER RAPID DEGRADATION OF RADIO CONDITIONS

CROSS REFERENCE

This application is a filing under 35 U.S.C. 371 of International Application No. PCT/GB2010/001511 filed Aug. 10, 2010, entitled "Generating Measurement Reports Under Rapid Degradation of Radio Conditions" claiming priority to U.S. Provisional Application No. 61/232,681 filed on Aug. 10, 2009, entitled "Generating Measurement Reports Under Rapid Degradation of Radio Conditions", which are incorporated by reference herein as if reproduced in their entirety.

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) and LTE-Advanced (LTE-A). For example, an LTE or LTE-A system might include an Evolved Universal Terrestrial Radio Access Network (E-UTRAN) node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

The signals that carry data between UEs and access nodes can have frequency, time, and coding parameters and other characteristics that might be specified by a network node. A connection between any of these elements that has a specific set of such characteristics can be referred to as a resource. A connection may be established by shared channels, such as in the case of an E-UTRAN, or by one or more radio links, such as in the case of a Universal Terrestrial Radio Access Network (UTRAN). A network node typically establishes a different resource for each UE or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods, devices, and systems for providing earlier opportunity for handover in a network to avoid call drops under rapid degradation of radio conditions. In a related art, a UTRAN may configure an event 1A. For instance, when a configured condition of event 1A is satisfied by a neighboring cell, i.e., when the signal strength or quality of a neighboring cell reaches the configured reporting range, the UE may transmit a measurement report including the cell measurement to the UTRAN. The UTRAN may then trigger an active set update procedure to add the neighboring cell in the active set by establishing an additional radio link between the neighboring cell and the UE, i.e. the UTRAN places the UE in soft handover. The call may be served by the first cell and second cell before the rapid deterioration of the radio link in the first cell. In order to provide earlier opportunity to handover, the event 1A may be triggered more quickly using at least one of a time to trigger (TTTrd) and a filter coefficient (FCrd) for rapid degradation of radio conditions, which may have different values than a time to trigger (TTT) and filter coefficient (FC), respectively, indicated by the network according to the 3rd Generation Partnership Project (3GPP) Technical Specification (TS) 25.331. In the case of an E-UTRAN, some events may also be triggered to perform a handover more quickly under rapid degradation of radio conditions. As such, the events may be configured to adjust at least one of the TTT and FC values appropriately using a scale factor under rapid degradation of radio conditions. Alternatively, the events may be configured with different values of at least one of TTT and FC under rapid degradation of radio conditions.

Figure 1:
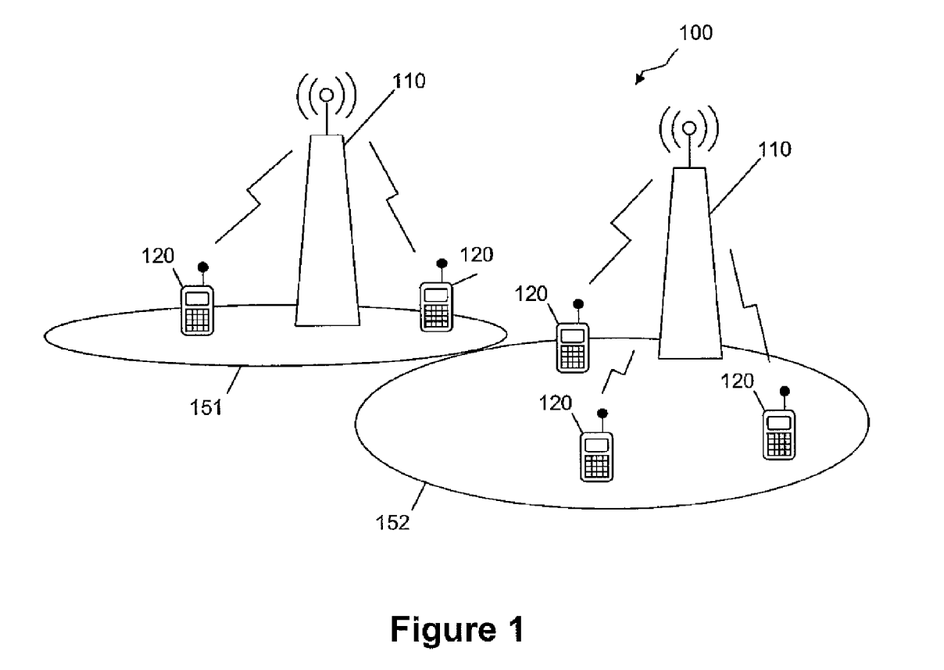
FIG. 1 is a diagram of a radio access network according to an embodiment of the disclosure.

FIG. 1 illustrates an embodiment of a radio access network (RAN) 100, which may be a LTE or LTE-A network as described in the Third Generation Partnership Project (3GPP). FIG. 1 is exemplary and may have other components or arrangements in other embodiments. In an embodiment, the RAN 100 may comprise at least one access device 110 and at least one UE 120. The access devices 110 may be an eNB, a base station, or other components that promote network access for the UEs 120.

The access devices 110 may communicate with any UE 120, which may be within the same cell, directly via a direct link, such as in a UTRAN. A cell may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell over shared links, e.g. as an uplink shared channel and a downlink shared channel, such as in an E-UTRAN. Additionally, the access devices 110 may communicate with other components or devices to provide for the components of the RAN 100 access to other networks, for instance using similar or different network protocols or technologies.

The UEs 120 may move about and their communications may be handed-over between the cells and so the UEs 120 may communicate with different access devices 110. For instance, a signal of a first cell 151 controlled by a first access node 110 may deteriorate due to changing radio conditions. As such, a handover procedure may be performed to switch the call to a second cell 152 and prevent the call from dropping. Hence, a second link may be established between the UE 120 and a second cell 152 or between the UE 120 and a downlink shared channel and an uplink shared channel of a second cell 152. In some embodiments, a relay node (not shown) in the second cell 152 may be accessed by the UE 120 to continue the same call.

In an embodiment, the RAN 100 may be a UTRAN, where a call for the UE 120 may be established over the radio link in the first cell. The radio link for the first cell may be included in an active set associated with the UE 120. During a soft handover, the RAN 100 may establish at least two radio links with the UE 120. The UE 120 may obtain cell measurements to monitor radio conditions of neighboring cells that are indicated by the network. When the UE 120 triggers a measurement report because a neighboring cell satisfies the configured condition of event 1A, the network may perform an active set update procedure with the UE 120 and add a second radio link to the active set, and hence the UE 120 may be in soft handover. Typically, the cell measurements may be obtained using a Layer Three (Layer 3) filter coefficient (FC) indicated by the access node 110, for instance based on the TS 25.331. Further, when a new neighboring cell is reported within the reporting range for the UE 120, the UE 120 may trigger an event, such as event 1A, to inform the access node 110 of the new candidate cell, and hence the access node 110 may add the radio link or the new cell to the active set. The event 1A may be triggered after a time to trigger (TTT) indicated by the access node 110 after when one or more neighboring cells, whose signal measured using the FC, reaches the reporting range and remains in the reporting range during the TTT. Triggering the event 1A after the TTT may ensure the stability of the radio conditions of the reported cell or cells.

In the case of rapid degradation of radio conditions in the cells of the active set, the UE 120 may not have sufficient time to report a new candidate cell from the set of monitored cells, or the network may not have sufficient time to act upon the report from the UE 120, before the call in the first cell is dropped. Further, if the active set associated with the UE 120 comprises only the radio link for the first cell, the likelihood of dropping the call may increase. Typically, to limit call drops, the UE 120 may be configured to obtain cell measurements using a larger "a" FC value and a smaller "k" FC value according to TS 25.331, trigger event 1A using a reduced TTT, and/or obtain cell measurements over an increased reporting range.

To trigger event 1A at an earlier time, the UE 120 may be configured to report event 1A using a new TTTrd value that is different than the TTT value described in TS 25.331. Further, to increase the likelihood of reporting a cell time during rapid degradation of radio conditions, the UE 120 may obtain cell measurements using a new FCrd value that is different than the FC value described in the TS 25.331. For example, the FCrd may be set to zero to bypass higher layer (e.g. Layer 3) filtering, and hence trigger event 1A more rapidly. For instance, a new "k" FCrd value that is smaller than the "k" FC value in the TS 25.331 may be used for at least one of the serving cell and any candidate or target cell of the monitored cells. In an embodiment, the new FCrd may only be applied to cells included in the active set. For example, if the active set contains only one cell, the new FCrd may be applied to the serving cell and the FC may be applied to the neighboring cells. Applying the FC to the neighboring cells may trigger event 1A and report reliable candidate cells, which may have stable radio conditions.

In an embodiment, the UE 120 may distinguish rapid degradation of radio conditions from non-rapid degradation of radio conditions by monitoring the values of consecutive measurements of the cells in the active set. When the active set comprises only one radio link, for instance in the case of a Received Signal Code Power (RSCP) or Ec/No measurement quantity, rapid degradation of radio conditions may be determined if the UE 120 detects a number of consecutively decreasing measurement values for the radio link in the active set. For example, rapid degradation of radio conditions may be detected if N consecutively decreasing measurement values are obtained for the radio link in the RSCP or Ec/No measurement quantity. Alternatively, in the case of path-loss measurement quantity, rapid degradation of radio conditions may be determined if the UE 120 detects a number of consecutively increasing measurement values for the radio link. Alternatively, rapid degradation of radio conditions may be detected if the measurement of the radio link in the active set reaches a threshold T1. For example, rapid degradation of radio conditions may be detected for RSCP or Ec/No measurements if the measurement value falls below T1, and for path-loss measurements if the measurement value exceeds T1.

If the active cell comprises more than one radio link, then rapid degradation of radio conditions may be detected by monitoring the values of consecutive measurements or the average measurement value for all the radio links in the active set, which may be based on the measurement quantity as described in the case of a single radio link in the active set. Alternatively, rapid degradation of radio conditions may be detected if the measurements or the average measurement for all the radio links reach a threshold T1, as described in the case of a single radio link in the active set.

Figure 2:
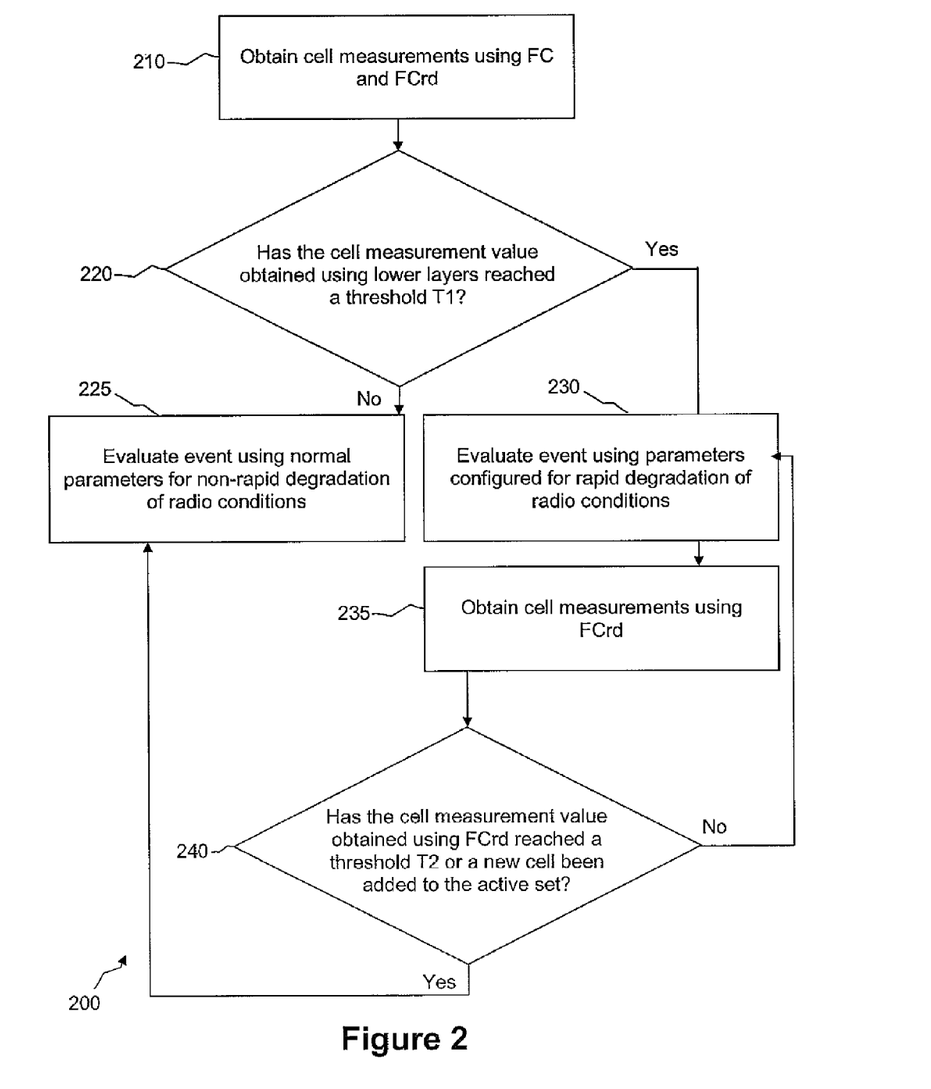
FIG. 2 is a flowchart of a method for detecting rapid degradation of radio conditions and triggering event 1A according to an embodiment of the disclosure.

FIG. 2 illustrates an embodiment of a method 200 for detecting rapid degradation of radio conditions and triggering event 1A in the case of a single radio link in the active set. In another embodiment, the method 200 may be used to trigger other events, for instance in an E-UTRAN. At block 210, the UE 120 may obtain cell measurements, for instance using FC and FCrd. In some embodiments, a FCrd value equal to about zero may be used to obtain unfiltered measurements, such as physical layer (Layer One or L1) measurements, which may reduce processing requirements. At block 220, the UE 120 may determine that radio conditions rapidly degrade if a cell measurement value obtained using the physical layer has reached a threshold T1, which may be based on the measurement quantity. For instance, the UE 120 may verify whether the measurement value provided by the lower layers is less than T1 when the measurement quantity is configured to RSCP or Ec/No measurements, or if the measurement value is larger than T1 when measurement quantity is configured to path-loss measurements. In an alternative embodiment, at block 220, in order to eliminate the need for filtering FCrd for the detection of rapid degradation of radio conditions, the UE 120 may verify whether the measurement value obtained using FC has reached a threshold T1' different than T1 and based on the measurement quantity (e.g. as described above for RSCP, Ec/No, or path-loss measurements). The T1 and T1' values may be chosen appropriately to avoid reporting cells with unsuitable or low quality radio conditions and to avoid reporting an excessive number of cells due to low T1 or T1' values.

If the condition of block 220 is satisfied, the method 200 may proceed to block 230 to handle the case of rapid degradation of radio conditions. Otherwise, the method 200 may proceed to block 225. At block, 225, the UE 120 may evaluate event 1A using normal parameters (e.g. TTT and FC) described in TS 25.331. Alternatively, at block 230, the UE 120 may evaluate event 1A using at least one of TTTrd and FCrd, and other parameters that may be configured to trigger the event during rapid degradation of radio conditions. In an embodiment, the FCrd may be applied to at least the serving cell, and the FC may be applied to the neighboring cells. The method 200 may then proceed to block 235, where the UE 120 may obtain cell measurements, for instance using FCrd.

The method 200 may then proceed to block 240, where the UE 120 may stop using TTTrd and FCrd to obtain cell measurements if the measurement value of the cell in the active set that is obtained using FCrd has reached a threshold T2, which may be based on the measurement quantity, or when the new candidate radio link is added to the active set. For example, the UE 120 may verify whether the measurement value obtained using FCrd is larger than T2 when the measurement quantity is configured to RSCP or Ec/No measurements, or if the measurement value is less than T2 when the measurement quantity is configured to path-loss measurements. If the condition of block 240 is satisfied, the method 200 may proceed to block 225 to evaluate event 1A using normal parameters. Otherwise, the method 200 may proceed to block 230 to evaluate event 1A using parameters configured for the case of rapid degradation of radio conditions.

In rapid degradation of radio condition, the reporting range associated with the event 1A may deteriorate and one or more neighboring cells, which may have radio conditions worse than the radio conditions of the first cell which satisfied the event 1A condition, may also satisfy the conditions for triggering the event 1A, and hence more measurement reports may be sent. In an embodiment, to reduce the quantity of reports sent from the UE 120 to the network, the prohibit timer may be started when a first event 1A is triggered during rapid degradation of radio conditions. The timer value (Tprohibit) may be long enough to allow an active set update in response to the event 1A report. During the time between activating the prohibit timer and its expiration, the cell measurements may be processed using "normal" parameters, e.g. TTT and FC, that are used for non-rapid degradation of radio conditions. The normal parameters may also be used and the prohibit timer may be stopped when the active set is updated and a new cell is added in response to an event 1A report. However, if the timer expires and the measurement of the serving cell has reached T2, the parameters TTTrd and FCrd may be used instead of the normal parameters. In an embodiment, to reduce the frequency of transmitted events 1A, the obtained measurement should be better than a threshold Tmin and/or a smaller reporting range constant (RCrd) may be used to evaluate event 1A condition for rapid degradation of radio conditions.

Figure 3:
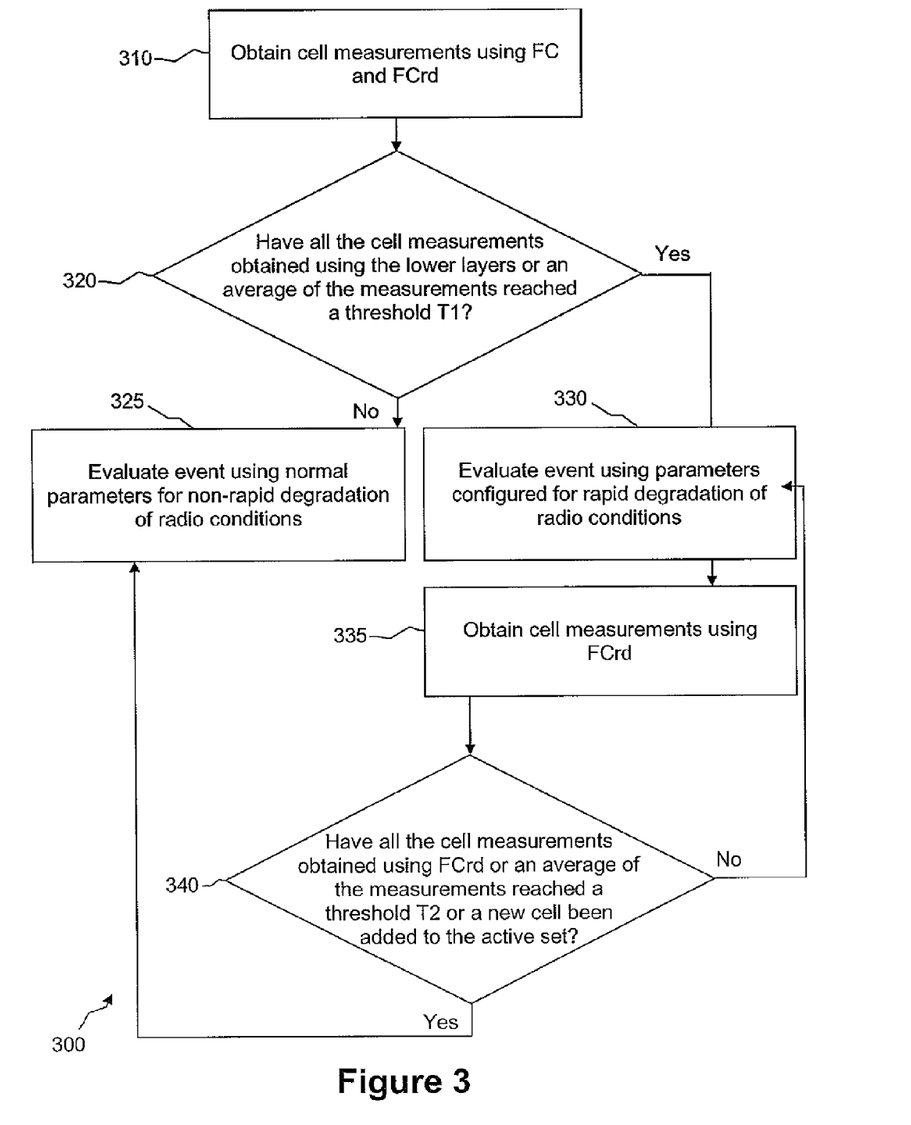
FIG. 3 is a flowchart of another method for detecting rapid degradation of radio conditions and triggering event 1A according to an embodiment of the disclosure.

FIG. 3 illustrates an embodiment of a method 300 for detecting rapid degradation of radio conditions and triggering event 1A in the case of a plurality of radio links in the active set. In another embodiment, the method 300 may be used to trigger other events, for instance in an E-UTRAN. At block 310, the UE 120 may obtain cell measurements, for instance using FC and FCrd. In some embodiments, the FCrd value may be set to about zero to obtain unfiltered or physical layer measurements, to reduce processing requirements. At block 320, the UE 120 may determine that radio conditions rapidly degrade if all measurements for the radio links in the active set obtained using lower layers (e.g. L1) have reached T1, based on the measurement quantity. For example, the UE 120 may verify whether the measurement values for all the links obtained using the lower layers are less than T1 in the case of RSCP or Ec/No measurements, or if all the measurement values are larger than T1 in the case of path-loss measurements. Alternatively, the UE 120 may determine if the average of the cell measurements obtained using FCrd has reached T1. In another embodiment, in order to eliminate the need for filtering FCrd for the detection of rapid degradation of radio conditions, the UE 120 may determine if all measurements for radio links in the active set obtained using FC have reached T1', or instead if the average of the cell measurements using FC has reached T1' depending on the measurement quantity (e.g. RSCP, Ec/No, or path-loss).

If the condition of block 320 is satisfied, the method 300 may proceed to block 330 to handle the case of rapid degradation of radio conditions. Otherwise, the method 300 may proceed to block 325. At block, 325, the UE 120 may evaluate event 1A using TTT and FC parameters described in TS 25.331. Alternatively, at block 330, the UE 120 may evaluate event 1A using at least one of TTTrd, FCrd, and other parameters for rapid degradation of radio conditions. The FCrd may be applied to at least the cells included in the active set and the FC may be applied to the neighboring cells. The method 300 may then proceed to block 335, where the UE 120 may obtain cell measurements, for instance using FCrd.

The method 300 may then proceed to block 340, where the UE 120 may then stop using TTTrd and FCrd to obtain cell measurements if one of the cell measurements, the average of the all the cell measurements, or the all the cell measurements, for instance obtained using FCrd, have reached T2, which may be based on the measurement quantity, or if a new cell is added to the active set. If the condition of block 340 is satisfied, the method 300 may proceed to block 325 to evaluate event 1A using normal parameters. Otherwise, the method 300 may proceed to block 330 to evaluate event 1A using parameters configured for the case of rapid degradation of radio conditions.

The following is an example of a portion of a ReportConfigEUTRA information element that could be used in the above methods:

```
EarlyTriggerA3 ::=              SQUENCE {
    threshold-EealyTriggerEntry      ThresholdEUTRA, -- T1
    threshold-EealyTriggerLeave      ThresholdEUTRA, -- T2
    threshold-EarlyTriggerProhibit   ThresholdEUTRA, -- Tmin
    quantityConfigEUTRA-EearlyTrigger QuantityConfigEUTRA,
                                     -- FCrd
    timeToTrigger-EarlyTrigger       TimeToTrigger
                                     -- TTTrd
}
```

In an embodiment, at least one of the parameters for triggering event 1A, such as T1, T1', T2, N, RCrd, FCrd, TTTrd, and/or Tprohibit described above, may be set by the RAN 100 and sent via Radio Resource Control (RRC) signaling, for instance by the access node 110, to the UE 120. The parameters may be set based on the geographical conditions. In another embodiment the values for the parameters may be pre-determined. The values for T1, T1', and T2 may be defined for different measurement quantities, such as RSCP, Ec/No, and path-loss (in 3GPP TS 25.331), based on intra-frequency measurement configuration. For example, T1 may be equal to about −12 and T2 may be equal to about −9 in the case of Ec/No, or T1 may be equal to about −106 and T2 may be equal to about −102 in the case of RSCP. Further, to reduce the quantity of transmitted signals to the UE 120, upon detecting rapid degradation of radio conditions, the measurement period may be reduced from about 200 milliseconds (ms) to about 100 ms or about 50 ms. In an alternative embodiment, to eliminate signaling of such parameters, the UE 120 may use predetermined parameter values, which may be fixed. For instance, the UE 120 may use a predetermined parameter N value equal to about four to detect rapid degradation of radio conditions.

In some embodiments, a new event identity may be configured instead of event 1A to report a new candidate cell during rapid degradation of radio conditions. As such, when the network receives the configured event instead of event 1A from the UE 120, the network may be aware of the rapid degradation of radio conditions and hence process the measurement report in a faster or urgent manner.

Figure 4:
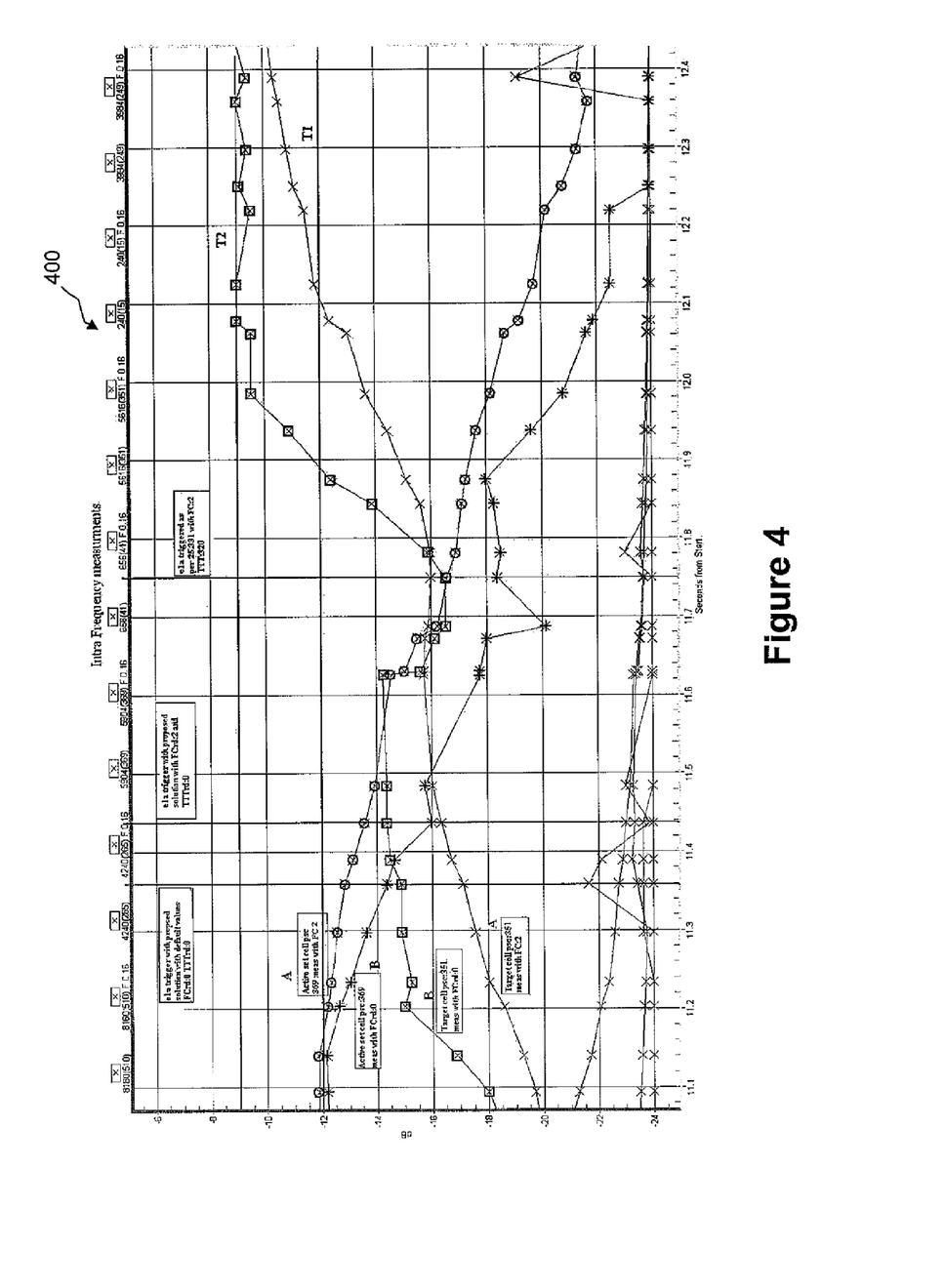
FIG. 4 is a chart of cell measurements according to an embodiment of the disclosure.

FIG. 4 illustrates a plurality of cell measurements 400, which may be obtained by the UE 120 for two cells; a first cell (primary scrambling code (psc:369) and a second neighboring cell (psc:351), in a UTRAN. Two sets of measurements, A and B, are shown for each of the first cell, which is in the active set, and the second neighboring cell, based on a reporting range constant value equal to about 3.5 Decibel (dB). For both cells, set A measurements are obtained based on the 3GPP TS 25.331, i.e., using configured parameters according to the standard, and set B measurements are obtained using configured parameters for rapid degradation of radio conditions. As shown, set A measurements and set B measurements decrease over time for the first cell and increase over time for the second cell, which reflects degradation of radio conditions for the first cell and improvement of radio conditions for the second cell. In FIG. 4, the decreasing set A and B measurements for the first cell are marked by "o" and "stars" respectively, and the increasing set A and B measurements for the second cell are marked by "x" and "squares" respectively.

Specifically, set A measurements for both the first cell and the second cell are obtained using "k" FC value equal to about 2 and a TTT equal to about 320 ms. Additionally, set B measurements are obtained for both the first cell and the second cell using "k" FCrd value equal to about zero to bypass high layer filtering and a TTTrd value equal to about zero ms, which may be configured for rapid degradation of radio conditions. Since, the FCrd value used for set B measurements for the first cell is less than the FC value for set A measurements and the measurements of the first cell are falling, set B measurements are smaller than the corresponding set A measurements and decrease more rapidly over time. For similar reasons, set B measurements are greater than the corresponding set A measurements and increase more rapidly over time for the second cell. Consequently, set B measurements for the first cell fall below a threshold T1 before the corresponding set A measurements, and set B measurements for the second cell reach above a threshold T2 before the corresponding set A measurements.

Since set B measurements for the first cell enter the reporting range of set A measurements for the second cell before set A measurements of the first cell do, event 1A is triggered at an earlier time for set B measurements for the first cell compared to set A measurements. As such, using FCrd for the first cell results in an earlier event 1A report compared to using the normal FC value. This earlier report is being triggered because set B measurements have already fallen below T1. Additionally, using a TTTrd value of 0 ms compared to the normal TTT value of 320 ms contributes to triggering the event at an earlier time. In FIG. 4, event 1A is triggered about 100 ms earlier with FCrd set to zero (FCrd:0) and about 300 ms earlier with TTTrd set to zero (TTTrd:0). The event is sent about 400 ms earlier when using both FCrd:0 and TTTrd:0, which is represented by the gap between the vertical time axis (thick line) at about 11.36 seconds (sec) and the vertical time axis (thick line) at about 11.75 sec. As a result of using FCrd and TTTrd, the UE may prevent a call established in the first cell from dropping by adding the second cell to the active set before the first cell becomes too weak.

Figure 5:
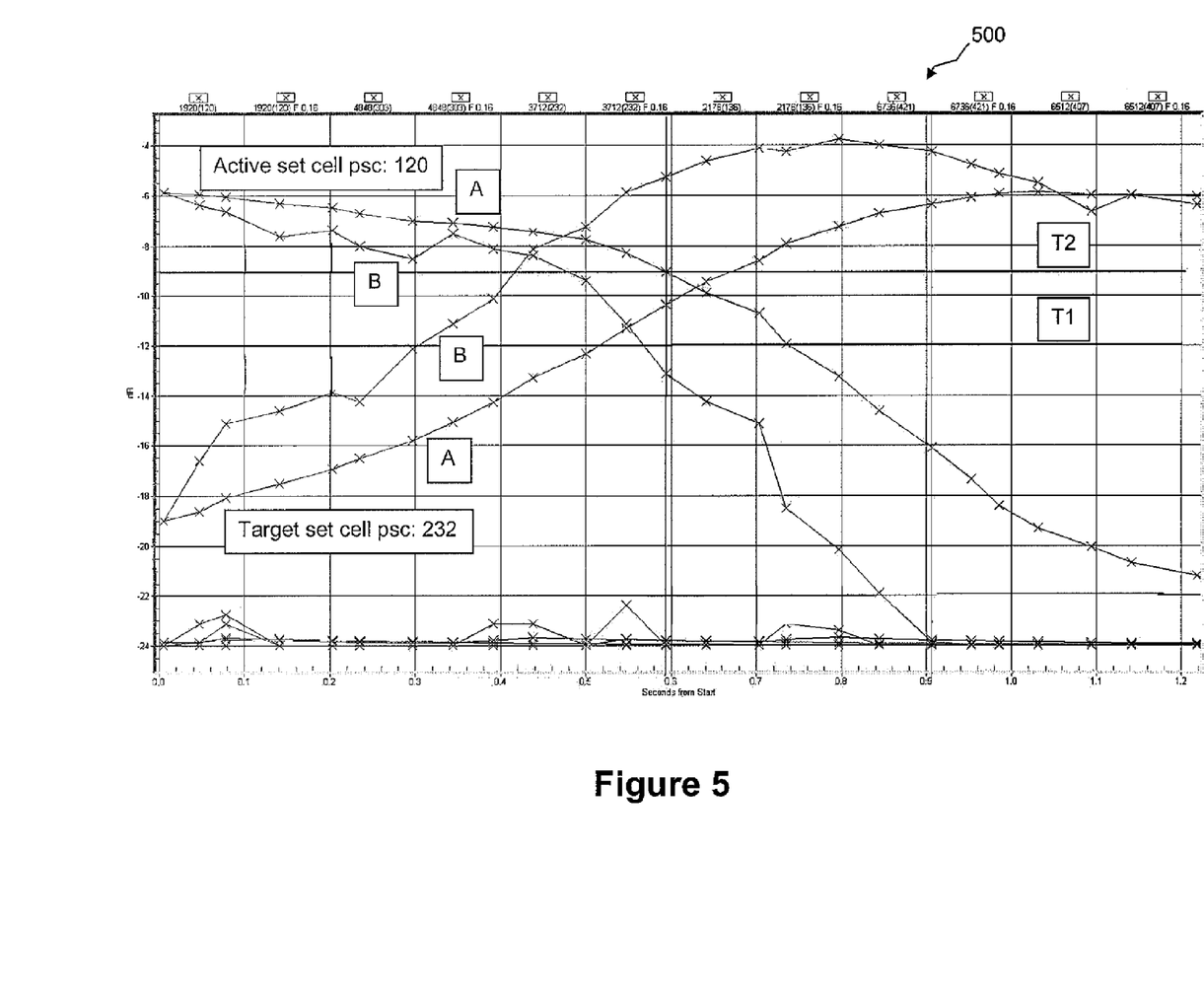
FIG. 5 is another chart of cell measurements according to an embodiment of the disclosure.

FIG. 5 illustrates another plurality of cell measurements 500, which may be obtained by the UE 120 for two cells; a first cell (primary scrambling code (psc:120) and a second neighboring cell (psc:232), in a UTRAN. Two sets of measurements, A and B, are shown for each of the first cell, which is in the active set, and the second neighboring cell, based on a reporting range constant value equal to about 3.5 Decibel (dB). For both cells, set A measurements are obtained based on the 3GPP TS 25.331, i.e., using configured parameters according to the standard, and set B measurements are obtained using configured parameters for rapid degradation of radio conditions. As shown, set A measurements and set B measurements decrease over time for the first cell and increase over time for the second cell, which reflects degradation of radio conditions for the first cell and improvement of radio conditions for the second cell.

Specifically, set A measurements for both the first cell and the second cell are obtained using "a" FC value equal to about 2 and a TTT equal to about 320 ms. Additionally, set B measurements are obtained for both the first cell and the second cell using an FCrd value equal to about zero to bypass high layer filtering and a TTTrd value equal to about zero ms, which may be configured for rapid degradation of radio conditions. Since, the FCrd value used for set B measurements for the first cell is less than the FC value for set A measurements and the measurements of the first cell are failing, set B measurements are smaller than the corresponding set A measurements and decrease more rapidly over time. For similar reasons, set B measurements are greater than the corresponding set A measurements and increase more rapidly over time for the second cell. Consequently, set B measurements for the first cell fall below a threshold T1 before the corresponding set A measurements, and set B measurements for the second cell reach above a threshold T2 before the corresponding set A measurements.

Since set B measurements for the two cells reach the two thresholds T1 and T2 before set A measurements due to the reduced FC value, event 1A may be triggered at an earlier time for set B measurements. Additionally, reducing the TTT value to trigger event 1A in the case of set B measurements contributes to triggering the event at an earlier time. Specifically, event 1A can be triggered at about 300 ms earlier using set B measurements instead of set A measurements, which is represented by the gap between the vertical time axis (dashed line) at about 0.6 ms and the vertical time axis (dotted line) at about 0.9 ms. As such, the parameters configured for rapid degradation of radio conditions and to obtain the set B measurements may be used to prevent a call established in the first cell from dropping during a handover. Instead, the call may be switched to the second cell before the radio conditions of the first cell become too weak to support the handover.

In the case of an E-UTRAN, the UE 120 may be instructed to perform measurements to facilitate a handover of the call, based on 3GPP TS 36.331. As such, when the signal of a first cell used to establish the call is weak, a handover procedure may be implemented to switch the call to a second cell. Prior to the handover, one of a plurality of events may be triggered to support UE mobility in the network. For instance, the UE 120 may trigger an event A3 if a radio link intra-frequency measurement of a neighboring cell is greater than the radio link measurement of the current used cell by a predetermined offset. Instead, the UE 120 may trigger an event A5 if the radio link measurement of the current used cell is less than a first threshold and the radio link measurement of the neighboring cell is greater than a second threshold. Alternatively, in the case of inter-frequency measurements, the UE 120 may trigger an event B2 if the serving cell measurement becomes worse than T1 and an inter RAT neighbor cell measurement becomes better than T2.

In an embodiment, some of the parameters may be configured to trigger an event, such as event A3, event A5, or event B2, during rapid degradation of radio conditions. For instance, the TTT value, FC value, and/or other parameters to detect rapid degradation of radio conditions may be adjusted to trigger the event at an earlier time than in the case of non-rapid degradation of radio conditions. For instance, a scale factor (SF) may be used to adjust or reduce at least one of the TTT and FC (k) values, or the TTCrd and/or FCrd may be specified and used to switch the cell more quickly and avoid dropping the call due to the rapidly deteriorating radio link. In order to determine whether the radio condition is rapidly degrading or not, the E-UTRAN may provide some parameters for the UE to apply. Alternatively, the UE may use predetermined parameter values, as described above.

Figure 6:
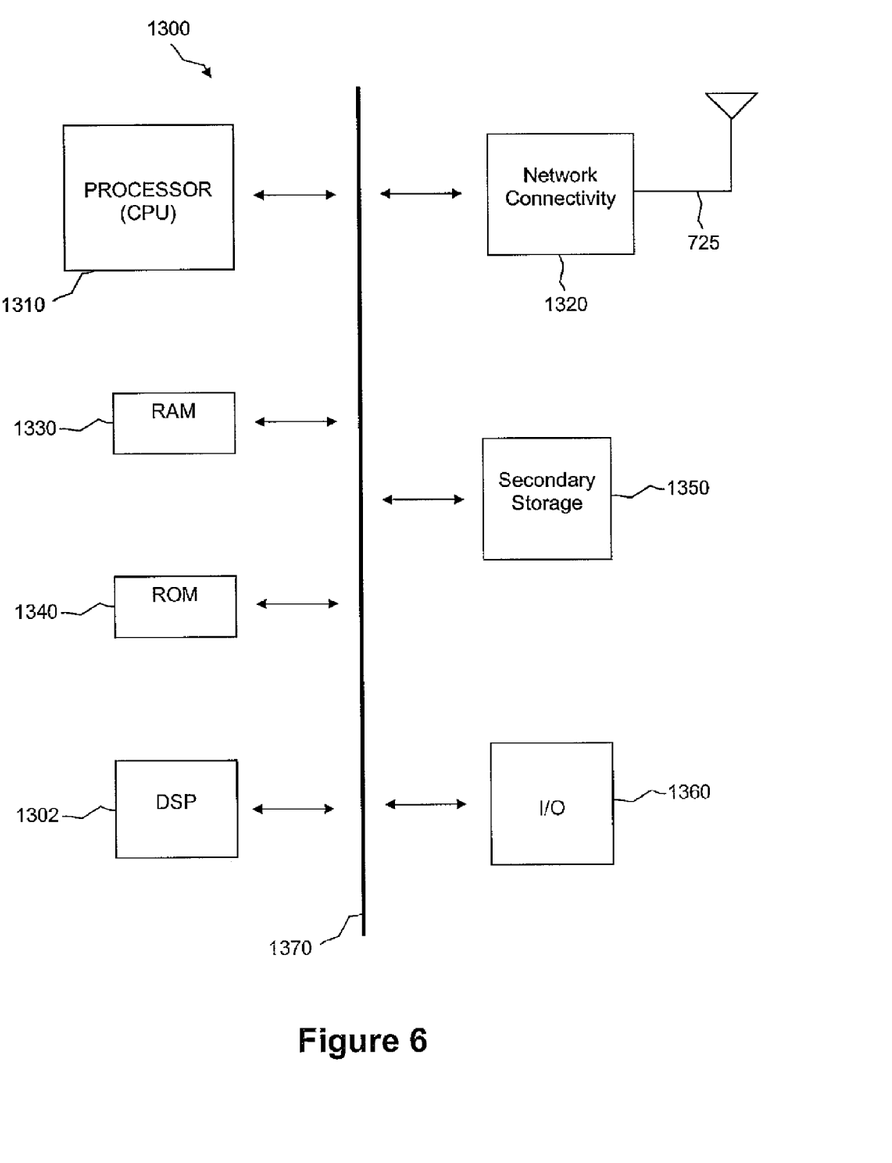
FIG. 6 illustrates a processor and related components suitable for implementing the several embodiments of the present disclosure.

The UE 120 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 1302 is shown as a separate component, the DSP 1302 be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components a 725 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 725 might be considered to be a component of the I/O devices 1360 instead of or in addition to being a component of the network connectivity devices 1320.

Various combinations of the components of the system 1300, including memory, hardware, firmware, software or others may be referred to herein as a "component".

The following are incorporated herein by reference for all purposes: 3GPP TS 25.331 and 3GPP TS 36.331. Appendix A, which is attached hereto and includes additional embodiments and disclosure, is also incorporated herein by reference for all purposes.

In an embodiment a UE is provided. The UE comprising at least one component configured to support a handover during decreasing radio conditions, wherein an event is triggered using at least one of a TTTrd value and an FCrd value that are different than the corresponding standard values indicated by a network.

The UE, wherein at least one of the TTTrd and FCrd values is used for cell measurements before the handover to switch a cell at an earlier time than using the corresponding standard values indicated by the network.

In another embodiment, a UE is provided, a UE comprising at least one component configured to support a method comprising obtaining cell measurements using network indicated standard parameters and parameters configured for rapid degradation of radio conditions, monitoring radio conditions, and evaluating an event using the parameters configured for rapid degradation of radio conditions if rapid degradation of radio conditions is detected, or using the network indicated standard parameters otherwise.

The UE, wherein the network indicated standard parameters include a TTT and a FC for high layer filtering, and wherein the parameters configured for rapid degradation of radio conditions include at least one of a TTTrd and an FCrd that have different values than TTT and FC, respectively.

In another embodiment, a UE is provided, comprising at least one component configured to support a method comprising detecting a weak signal corresponding to a radio link used to support a call, and evaluating an event to trigger a handover using parameters configured using a SF.

In another embodiment, an access node is provided, comprising at least one component configured to support a handover during decreasing radio conditions, wherein an event is triggered by a UE in communication with access node using at lease one of a TTTrd value and a FCrd value that are different than the corresponding standard values indicated to the UE.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
   at least one processor configured to support a handover during decreasing radio conditions of one or more cells in an active set, wherein the processor is configured to cause the UE to:
   obtain cell measurements for the one or more cells in the active set using a filter coefficient for rapid degradation of radio conditions (FCrd) value to detect a rapid degradation of radio conditions event;
   when an event is triggered based on the obtained cell measurements, evaluate the event using a time to trigger for rapid degradation of radio conditions (TTTrd) value and the FCrd value that are different than corresponding standard time-to-trigger (TTT) and filter coefficient (FC) values indicated by a network, wherein the FCrd value is set to bypass higher layer filtering; and
   when the rapid degradation of radio conditions event is resolved, continue to evaluate the event using the standard values.

2. The UE of claim 1, wherein the standard values are indicated according to the 3rd Generation Partnership Project (3GPP) Technical Specification (TS) 25.331 or 36.331.

3. The UE of claim 1, wherein the TTTrd and FCrd values is used for cell measurements before the handover to switch a cell at an earlier time than using the corresponding standard values indicated by the network.

4. The UE of claim 3, wherein the FCrd value is only used for the active set and the FC value is used for at least a neighboring cell.

5. The UE of claim 1, wherein rapid degradation of radio conditions is detected if a predetermined number of consecutively decreasing measurement values for a cell is observed for a Received Signal Code Power (RSCP) or Ec/No measurement quantity, or if a predetermined number of consecutively increasing measurement values for a cell is observed for a path-loss measurement quantity.

6. The UE of claim 1, wherein rapid degradation of radio conditions is detected if the cell measurement exceeds a threshold.

7. The UE of claim 6, wherein the cell measurement is a path-loss measurement.

8. The UE of claim 1, wherein rapid degradation of radio conditions is detected if the cell measurement is less than a predetermined threshold.

9. The UE of claim 8, wherein the cell measurement is a received signal code power (RSCP) or Ec/No measurement.

10. The UE of claim 1, wherein the TTTrd and FCrd values are signaled by the network.

11. The UE of claim 1, wherein the TTTrd and FCrd values are predetermined fixed values.

12. The UE of claim 1, wherein the network is a Universal Terrestrial Radio Access Network (UTRAN) and the handover is a soft or softer handover based on an active set, and wherein the active set comprises at least one radio link in a cell.

13. The UE of claim 1, wherein the network is an Evolved Universal Terrestrial Radio Access Network (E-UTRAN).

14. The UE of claim 13, wherein the event is a first event A3 for intra-frequency measurements, a second event A5 for intra-frequency measurements, or an event B2 for inter-frequency measurements.

15. The UE of claim 13, wherein the TTTrd value, FCrd value, other parameters configured for rapid degradation of radio conditions, or combinations thereof are adjusted using a scale factor (SF).

16. The UE of claim 15, wherein the TTTrd value, FCrd value, other parameters configured for rapid degradation of radio conditions, or combinations thereof are predetermined or signaled by a Radio Resource Control Protocol (RRC).

17. A method of a user equipment (UE), comprising:
   obtaining, by the UE, cell measurements of one or more cells in an active set using a filter coefficient for rapid degradation of radio conditions (FCrd) value to detect a rapid degradation of radio conditions event;

monitoring, by the UE, radio conditions;

evaluating, by the UE, an event triggered based on the obtained cell measurements using parameters configured for rapid degradation of radio conditions if rapid degradation of radio conditions is detected, or using network indicated standard parameters otherwise, wherein the parameters configured for rapid degradation of radio conditions include a time to trigger for rapid degradation of radio conditions (TTTrd) value and the FCrd value, wherein the FCrd value is set to bypass higher layer filtering; and when the rapid degradation of radio conditions event is resolved, continue to evaluate the event using the network indicated standard values.

18. The method of claim 17, wherein the network indicated standard parameters include a time to trigger (TTT) and a filter coefficient (FC) for high layer filtering.

19. The method of claim 17, wherein the cell measurements obtained using parameters configured for rapid degradation of radio conditions are performed using a range constant for rapid degradation (RCrd) that is smaller than the range constant described in TS 25.331.

20. The method of claim 17, wherein in the case of a single radio link in an active set of radio links, rapid degradation of radio conditions is detected if the cell measurement obtained using parameters configured for rapid degradation of radio conditions is less than a first threshold T1 in the case of a received signal code power (RSCP) or Ec/No measurement or exceeds T1 in the case of a path-loss measurement, or if the cell measurement obtained using network indicated standard parameters is less than a second threshold T1' in the case of a RSCP or Ec/No measurement or exceeds T1' in the case of a path-loss measurement.

21. The method of claim 20, wherein the cell measurement obtained using parameters configured to detect rapid degradation of radio conditions is a physical layer cell measurement.

22. The method of claim 20, further comprising using network indicated standard parameters instead of parameters configured for rapid degradation of radio conditions if a new candidate radio link is added to the active set.

23. The, claim 20, further comprising using network indicated standard parameters instead of parameters configured for rapid degradation of radio conditions if the cell in the active set, which is filtered using the FCrd, is greater than a third threshold T2 that is larger than T1, or if the cell in the active set, which is filtered using a filter coefficient (FC) from the network indicated standard parameters, is greater than a fourth threshold T2' that is larger than T1'.

24. The method of claim 17, wherein in the case of a plurality of radio links in an active set of radio links, rapid degradation of radio conditions is detected if all the active set cell measurements or an average of the measurements obtained using parameters configured for rapid degradation of radio conditions are less than T1 in the case of a received signal code power (RSCP) or Ec/No measurement or exceed T1 in the case of a path-loss measurement, or if all the active set cell measurements or an average of the measurements obtained network indicated standard parameters are less than T1' in the case of a received signal code power (RSCP) or Ec/No measurement or exceed T1' in the case of a path-loss measurement.

25. The method of claim 24, wherein further comprising using network indicated standard parameters instead of parameters configured for rapid degradation of radio conditions if a new candidate radio link is added to the active set.

26. The method of claim 24, further comprising using network indicated standard parameters instead of parameters configured for rapid degradation of radio conditions if all the radio links cell measurements in the active set or an average of the measurements exceed a third threshold T2 in the case of a received signal code power (RSCP) or Ec/No measurement or are less than T2 in the case of a path-loss measurement.

27. The method of claim 17, wherein a prohibit timer reduces the frequency of transmitted measurement reports.

28. The method of claim 27, wherein the prohibit timer is activated when an event 1A is triggered during rapid degradation of radio conditions and deactivated when a new radio link is added to an active set of radio links.

29. The method of claim 27, wherein the prohibit timer has a time value (Tprohibit) that allows active set updates in response to the measurement reports, and wherein the network indicated standard parameters instead of the parameters configured for rapid degradation of radio conditions are used during the prohibit timer activation time.

30. The method of claim 17, wherein the parameters configured for rapid degradation of radio conditions are signaled from an access node or a network.

31. The method of claim 17, wherein the parameters configured for rapid degradation of radio conditions are predetermined.

32. A method of a user equipment (UE), comprising:

detecting, by the UE, a weak signal corresponding to a radio link of an active cell used to support a call, the signal detected using a filter coefficient for rapid degradation of radio conditions (FCrd) value to detect a rapid degradation of radio conditions event;

evaluating, by the UE, an event to trigger a handover based on the detected signal using parameters configured using a scale factor (SF) to support rapid degradation of radio conditions, wherein the SF is used to adjust the values of the parameters for triggering the event, wherein the parameters configured to support rapid degradation of radio conditions include a time to trigger for rapid degradation of radio conditions (TTTrd) and the FCrd that are different than corresponding standard time-to-trigger (TTT) and filter coefficient (FC) values indicated by a network, wherein the FCrd is adjusted to bypass higher layer filtering; and when the rapid degradation of radio conditions event is resolved, continue to evaluate the event using the standard values.

33. The method of claim 32, wherein the TTTrd and FCrd are reduced using the SF to trigger the event during rapid degradation of radio conditions at an earlier time than in the case of non-rapid degradation of radio conditions.

* * * * *

UNITED STATES PATENT AND TRADEMARK OFFICE
CERTIFICATE OF CORRECTION

PATENT NO. : 9,014,688 B2  Page 1 of 1
APPLICATION NO. : 13/389238
DATED : April 21, 2015
INVENTOR(S) : Venkateswarlu Katepalli et al.

It is certified that error appears in the above-identified patent and that said Letters Patent is hereby corrected as shown below:

In the Specification

Colum 10, Line 7 replace "1302 be" with --1302 might be--

Colum 10, Line 38 replace "components a 725" with --components 725--

Signed and Sealed this
Nineteenth Day of January, 2016

Michelle K. Lee
*Director of the United States Patent and Trademark Office*